UNITED STATES PATENT OFFICE

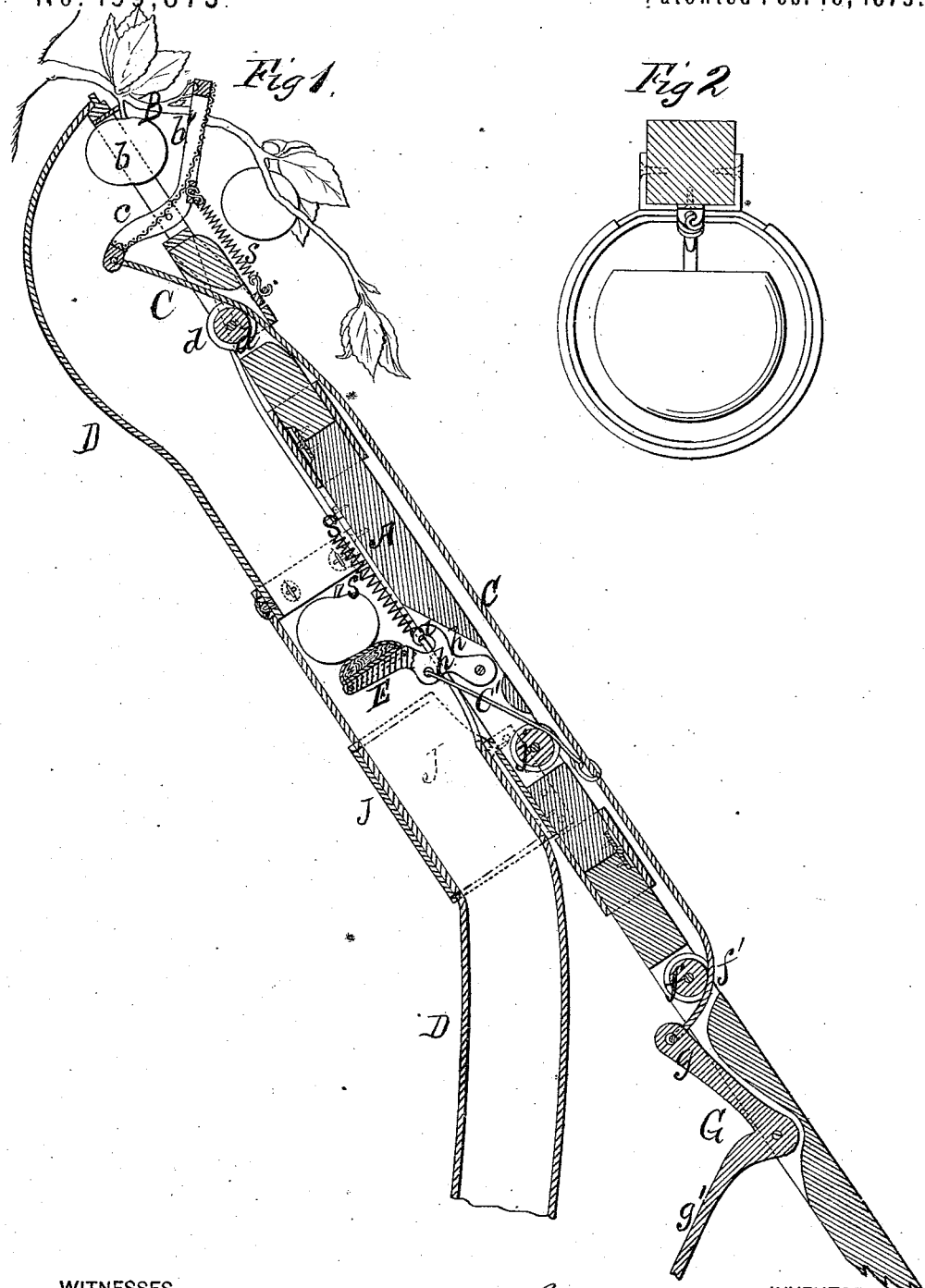
C. A. WERDEN.
Fruit-Gatherer.
No. 159,873.
2 Sheets--Sheet 1.
Patented Feb. 16, 1875.
WITNESSES
Villette Anderson
Robert Everett
INVENTOR
Cyrus A. Werden
Chipman Fosmer & Co,
ATTORNEYS

CYRUS A. WERDEN, OF WAUKEGAN, ILLINOIS, ASSIGNOR TO HIMSELF AND WILLIAM B. WERDEN, OF SAME PLACE.

IMPROVEMENT IN FRUIT-GATHERERS.

Specification forming part of Letters Patent No. 159,873, dated February 16, 1875; application filed October 31, 1874.

*To all whom it may concern:*

Be it known that I, CYRUS A. WERDEN, of Waukegan, in the county of Lake and State of Illinois, have invented a new and valuable Improvement in Fruit-Gatherer; and I do hereby declare that the following is a full, clear, and exact description of the construction and operation of the same, reference being had to the annexed drawings making a part of this specification, and to the letters and figures of reference marked thereon.

Figure 1:
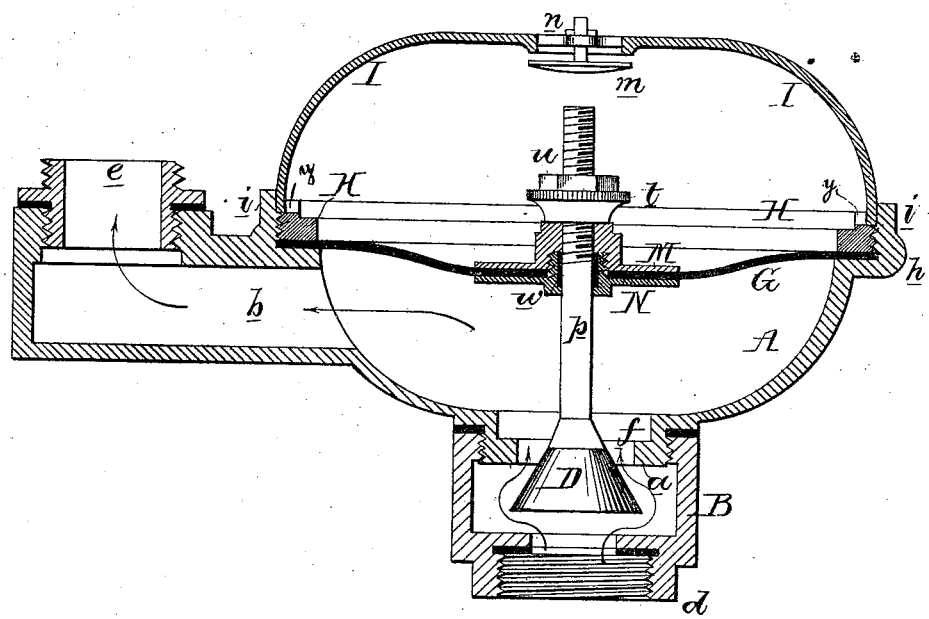
Figure 2:
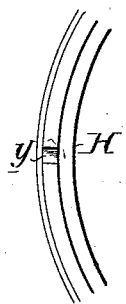
Figure 3:
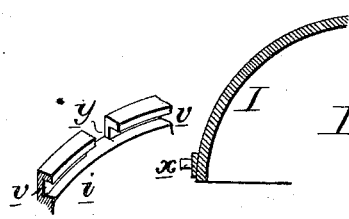

Figure 1 of the drawing is a representation of a longitudinal section of my fruit-gatherer, and Figs. 2 and 3 detail views in section of the same.

This invention has relation to fruit-gatherers wherein are employed a griping or seizing jaw at the upper end of a pole, a flexible tube for conveying the fruit when gathered into a suitable receptacle, and a valve within the said tube, whereby the apples are checked in their descent, and are prevented from being bruised thereby; and the nature of the invention consists in a metallic sleeve for the said valve, within which it works, and to the upper edge of which the flexible tube is rigidly secured, whereby the said tube is prevented from being raised by an upward vibration of the valve, thereby preventing the formation of a sack, within which a gathered fruit would be received, and allowing it to be accurately directed downward when the said valve is opened, as will be better understood from the following explanation.

In the annexed drawings, A designates the pole of my improved picker, which is composed of several sections, in order that the length thereof may be increased or diminished according to the height of the tree to be stripped. B designates the picking device, consisting of a fixed part, $b$, and a jaw, $b'$, hinged thereto, the latter being held open by a spring, $s$, and actuated to close by means of a cord, C, attached to an arm, $c$, of the jaw $b'$, passing thence downward over a pulley, $d$, in a slot, $d'$, of the pole A, to the front thereof; thence downward over a pulley, $f$, in a slot, $f'$, of the said pole, to a pivoted angular lever, G, to the end of the weight-arm $g$ of which it is then properly secured. When the power-arm $g'$ of this lever is drawn inward by the operator, the weight end thereof is forced up outward, causing the hinged jaw $b'$ to close in upon the fixed portion $b$ of the picker, and breaking off the fruit, which may be seized by the said jaw from the branch of the tree. The fruit thus picked is conducted by a flexible tube, D, downward to a sack or other receptacle therefor; but, as in a high tree the velocity of descent obtained by the fruit would be such as to bruise, and consequently seriously injure, the fruit, I have caused the falling thereof to be arrested by a valve, E, as shown in Fig. 1 of the drawings. This valve is provided with a stem, $h$, by means of which it is pivoted to vibrate vertically within a slot, $h'$, of the pole A, and it is held in a horizontal position, as shown in Figs. 1 and 3, by means of a spring, $s'$, attached to a hook, $i$, upon the upper part of the stem $h$, and to the pole A above the valve. It is actuated to open and allow the passage of an apple downward by means of a cord, C′, which is rigidly attached to the valve-stem, and, passing over a pulley, $j$, in the lower part of the slot $h'$, to the cord C. Hence, when an apple has been arrested by the said valve, and the cord C is actuated to pluck a second, at the moment of plucking the second the first is allowed to escape, the act of closing the jaw $b'$ having the effect of opening the valve E.

It is a common defect with this class of pickers that when the valve E is caused to vibrate downward by actuating the angular lever G, for the purpose above described, its upward vibration to a horizontal position, consequent upon the release of the said lever and the reaction of the spring $s'$, will carry the flexible tube D up with it, thereby forming a sack, within which the next fruit will be received. Consequently, when the valve is again opened, such opening will fail to allow the said fruit to be discharged.

In order to obviate this defect I have devised the following: I apply just below the valve a cylindrical sleeve, J, rigidly secured to the pole A, and preferably extending down below the lowest point of vibration of the said valve, to the upper edge of which the flexible tube D is secured in any suitable manner,

W. H. POUNDS.
Gas-Regulator.

No. 162,948. Patented May 4, 1875.

Witnesses.
Harry Smith
Hubert Howson

W<sup>m</sup> H. Pounds
by his Attorneys
Howson and Son